United States Patent [19]
Halstead

[11] 3,743,761
[45] July 3, 1973

[54] HIGH VOLTAGE RECTIFIER HOLDER
[75] Inventor: Richard J. Halstead, Chesapeake, Va.
[73] Assignee: General Electric Company, Portsmouth, Va.
[22] Filed: Aug. 10, 1971
[21] Appl. No.: 170,579

[52] U.S. Cl. ............ 174/52 R, 317/100, 317/234 G, 337/213, 339/59 R
[51] Int. Cl. ............................ H05k 5/02, H011 1/02
[58] Field of Search ................. 174/16 R, 50, 52 R; 317/99, 100, 234 R, 234 G, 234 W; 337/186, 195, 207, 213, 214, 215, 219, 239; 339/59 R

[56] References Cited
UNITED STATES PATENTS

| 2,471,825 | 5/1949 | Long | 174/135 UX |
| 2,481,893 | 9/1949 | Wilcox | 337/213 X |
| 2,614,190 | 10/1952 | Conrad | 337/213 X |
| 2,842,741 | 7/1958 | Simkins | 174/50 X |
| 2,979,645 | 4/1961 | Maiden | 317/234 W |
| 3,086,070 | 4/1963 | Twaddell et al. | 174/52 R |
| 3,519,887 | 7/1970 | Schreiner | 317/99 |
| 3,425,023 | 1/1969 | Krol et al. | 339/59 R |

Primary Examiner—Laramie E. Askin
Attorney—James E. Espe, Stanley C. Corwin, Joseph B. Forman et al.

[57] ABSTRACT

A holder including a pair of housings for receiving the ends of a high voltage solid-state rectifier, leaving the intermediate section of the rectifier exposed for cooling. Each end of the rectifier is received by a terminal which is slidingly mounted within a housing. Spring means are provided to bias the terminals into contact with the ends of the rectifier. A conductor associated with one terminal is directed along a portion of the body of the rectifier to distribute the voltage gradient therein, and strain relief means are provided to prevent the output conductor from being pulled loose. Each of the housings is provided with a latching cover or door to facilitate the installation and withdrawal of the solid-state rectifier.

11 Claims, 2 Drawing Figures

PATENTED JUL 3 1973
3,743,761
FIG.1
FIG.2
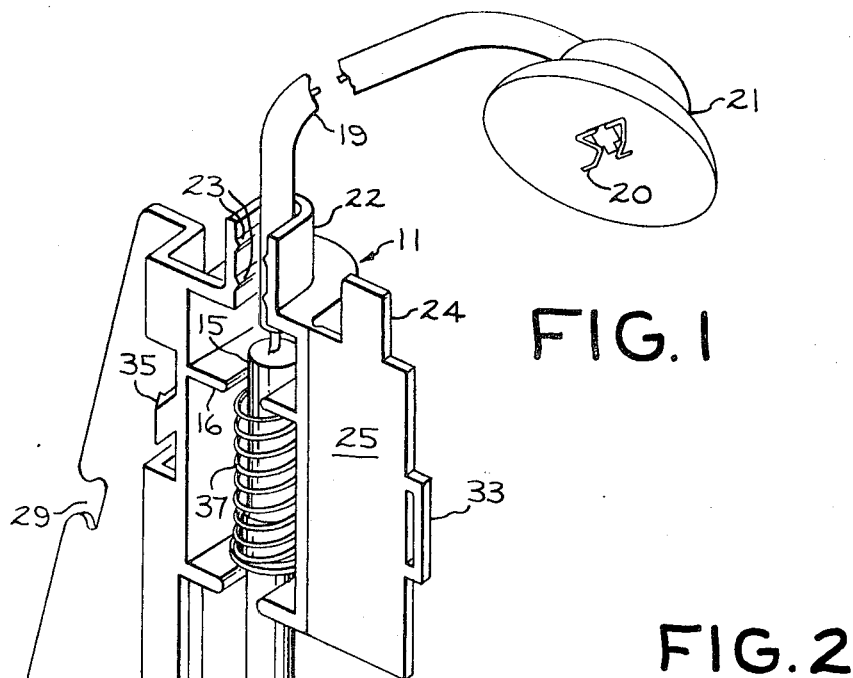
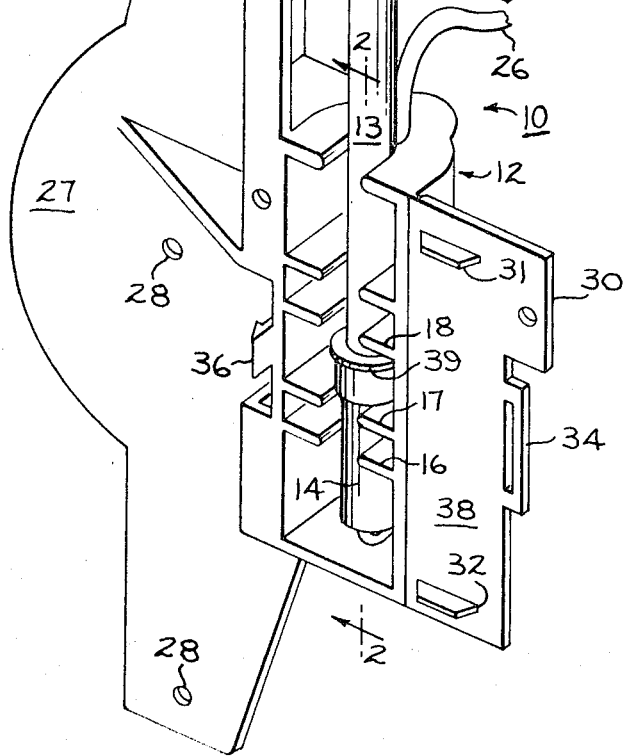
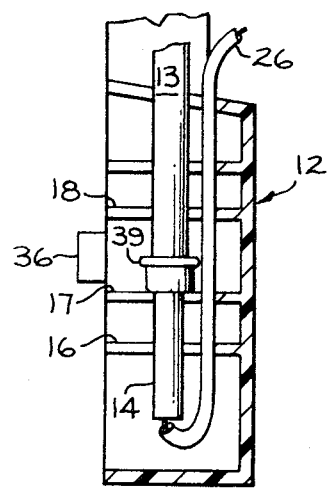
INVENTOR
RICHARD J. HALSTEAD
BY *James E. Espe*
HIS ATTORNEY

HIGH VOLTAGE RECTIFIER HOLDER

BACKGROUND OF THE INVENTION

The present invention relates to means for receiving an electrical discharge device and, more particularly, to an improved holder for a solid-state rectifier.

Solid-state rectifiers have been used in areas where their particular characteristics render them more desirable or economical than conventional vacuum tube rectifiers. Such solid-state rectifiers are often constituted by a plurality of rectifying elements stacked together to form an elongate element in the shape of a rod or cylinder. Ordinarily, the group of stacked elements is enclosed within an outer casing or tube, the tube being fitted with contacts at either end and having means to bias the contacts into engagement with the ends of the rectifier. Until recently, the maximum voltage capabilities of such rectifiers were such as to preclude them from use in television applications wherein potentials of over 15 kilovolts were encountered. Recently, however, it has become possible to manufacture such rectifiers having voltage capabilities of over 20 kilovolts and which are capable of meeting the higher voltage requirements of a modern television receiver.

Holders which have been designed for previous, lower-voltage solid state rectifiers have in many cases been found inadequate for use within the confines of a television receiver cabinet and, moreover, are electrically inadequate in view of the higher voltages obtained with the new-style rectifier. The steeper voltage gradient existing across the rectifier, along with the increased likelihood of corona due to the higher voltages, have presented users of high voltage rectifiers with the problem of devising rectifier holders which will overcome the problems posed by the higher voltages.

It will therefore be seen that it would be desirable to provide a rectifier holder which receives various types of high voltage solid state rectifiers and adequately insulates and protects the rectifier, while providing adequate cooling.

It is therefore an object of the present invention to provide a solid state high voltage rectifier holder which will receive various types of rectifiers.

It is another object of the present invention to provide a solid state rectifier holder which will withstand voltages above those previously encountered in the use of such rectifiers.

It is a further object of this invention to provide a holder for a high voltage solid state rectifier which encloses and supports the rectifier, while providing adequate cooling thereto.

It is still a further object of this invention to provide a high voltage solid state rectifier holder which mitigates uneven voltage gradients within the rectifier.

SUMMARY OF THE INVENTION

Briefly stated, in accordance with one aspect of the invention, the foregoing objects are achieved by providing a rectifier holder including a pair of spaced housings which receive the ends of a solid state rectifier. Each housing has a terminal mounted therein for receiving one end of the rectifier, and is provided with a passageway or opening for a conductor extending from the terminal. The housings are further provided with door means which may be opened to allow the insertion and withdrawal of the rectifier.

In a preferred embodiment of the invention, the terminal means disposed in the enclosures are formed with progressively increasing diameters for receiving rectifiers of different sizes. Further, the housing receiving the anode end of the rectifier is formed to direct the conductor extending from the terminal therein along a portion of the rectifier, supporting capacitive feedback which lowers the voltage gradient within that section of the rectifier.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which:

FIG. 1 is a perspective view of a high voltage solid state rectifier holder embodying principles of the present invention; and FIG. 2 is a section view of a portion of the holder taken along 2—2 of FIG. 1.

DESCRIPTION OF A PREFERRED EMBODIMENT

Referring now to FIG. 1 there is shown a perspective view of the inventive high voltage rectifier holder, generally indicated at 10. A pair of housings 11 and 12 receive the upper and lower ends of a high voltage, solid state rectifier 13. The anode end of the rectifier, enclosed in lower housing 12, is received in a conductive terminal 14. The upper, cathode end of rectifier 13 is similarly received by conductive terminal 15. Each enclosure is provided with at least one abutment 16 having an opening therein for receiving a terminal. The abutment of upper housing 11 further serves as a stop for a spring 37 which biases terminal 15 against rectifier 13. It will be seen that lower housing 12 is provided with additional abutments 17 and 18. These additional abutments serve as alternative supports which may be engaged by the expanded-diameter section of lower terminal 14.

An insulated conductor 19 is connected to the upper end of cathode terminal 15 for applying high voltage electrical energy from the rectifier to a suitable device, such as the second anode of a cathode ray tube. A conductive clip 20 and insulative cap 21 are affixed to the distal end of the conductor. A U-shaped collar generally indicated at 22 is formed about an opening in the upper end of housing 11 to constitute a strain relief. A pair of pointed ridges 23 are provided upon the inner surface of collar 22 and engage the resilient outer surface of conductor 19 upon insertion of the conductor into the U-shaped collar. The engagement of the outer covering of conductor 19 by ridges 23 thus provides physical resistance to the withdrawal of conductor 19 from the housing. Retention of conductor 19 in the collar is assured by the presence of an extension 24 formed at the top of a door 25.

A second conductor 26 supplies current to the anode end of high-voltage rectifier 13 by way of terminal 14. Conductor 26 is connected to the lower end of terminal 14 by suitable means such as soldering and extends upwardly through apertures formed in housing 12 alongside the lower portion of rectifier 13, as will be discussed hereinafter. A main body portion of the holder connects and supports housings 11 and 12, rigidly maintaining them in spaced relationship. The body portion 27 may advantageously be provided with holes 28 for affixation to a suitable mount. A necked-down slot 29 is also formed in the body portion for retaining clip 20 when conductor 19 is not connected to the second anode of the cathode ray tube. Doors 25 and 38 are associated with upper and lower housings 11 and 12, respectively. While the doors may be separately constructed and provided with suitable hinges, it has been found advantageous to form each door as an integral part of its housing. The intersection between the door and housing has a reduced thickness to facilitate operating of the door. It has been found that a material such as polypropylene provides the requisite support and electrical insulative properties, while having sufficient resiliency to allow the unitary molding of doors and housings.

Each door is provided with an extension 33, 34 having an opening therein. Door 38 is advantageously provided with an extended portion 30 which overlaps enclosure 12. An aperture provided in the extended portion aligns with a matching aperture in the body adjacent enclosure 12. Securing means may then be threaded through the aligned apertures when the door 38 is closed to prevent the unintentional or unauthorized opening of the door.

Protrusions 31 and 32 are formed on the inside of door 38 and extend within housing 12 to maintain the rectifier 13 and associated terminal 14 and conductor 26 seated in the apertures provided for them within the housing.

On the opposite side of housings 11 and 12 from the door hinge upstanding latch means 35 and 36 are provided for engaging the apertures in extensions 33 and 34, respectively. Again, the resilient nature of the housing material serves to allow the latch means sufficient flexibility to resiliently engage the apertures in extensions 33 and 34. To open the doors the resilient latch means are manually displaced, disengaging them from the door apertures.

Turning now to FIG. 2, a sectional view of lower housing 12 is shown, clearly revealing the relationship between rectifier 13, terminal 14, and conductor 26. It will be seen that rectifier 13 seats in the enlarged upper end of terminal 14, resting upon an annular ridge formed at the mouth of the lower, reduced-diameter portion of terminal 14. It will be apparent from the Figure that alternate types of solid state rectifiers having substantially smaller diameters than that represented at 13, and having substantially greater lengths, will be received within the lower, reduced-diameter portion of the terminal. Major variations in rectifier length may be accomodated by placing terminal 14 on others of the abutments provided, while minor variations in length are accomodated by the resilient spring 37 which biases upper terminal 15 within housing 11.

The mouth of each terminal is provided with a rolled lip 39 in order to preclude corona discharge. It will be seen that conductor 26 extends upwardly through housing 12 by way of suitable apertures formed in abutments 16, 17 and 18, and in the upper surface of the housing. The conductor is also received in the apertures which are so formed to space the conductor a predetermined distance away from the rectifier. In practice it has been found that a spacing of approximately one-eighth inch is desirable to provide the proper degree of capacitive feedback between the conductor and the rectifier. By extending the conductor alongside the rectifier for approximately one third of its length, measured from the anode end, sufficient capacitive feedback is applied to the rectifier for smoothing the otherwise abrupt voltage gradient arising within the rectifier. By thus mitigating the voltage gradient, detrimental heating of the rectifier is precluded with the result that the rectifier is rendered more efficient and reliable an operation.

Returning to FIG. 1, it will be seen that while the terminal ends of rectifier 13 are fully enclosed for providing protection and insulation, the central portion of the rectifier is left exposed for maximum cooling. The housings 11 and 12 thus provide the necessary support and physical and electrical protection to the rectifier, while allowing the maximum cooling possible.

To remove the rectifier 13 from the holder, it is only necessary to displace latch means 35 and 36 to open doors 25 and 38. Rectifier 13 and its associated terminals 14 and 15 are then slid outwardly through the apertures provided in the abutments and in the housing surfaces. Spring 37 may be overcome by hand pressure so as to facilitate the ready removal of the rectifier and terminals from the holder. It will be seen that the operation may be readily carried out without the use of tools, facilitating the inspection and replacement of the rectifier.

As will be evident from the foregoing description, certain aspects of the invention are not limited to the particular details of construction of the examples illustrated, and it is therefore contemplated that other modifications or applications will occur to those skilled in the art. It is accordingly intended that the appended claims shall encompass all such modifications and applications as do not depart from the spirit and scope of the invention.

What is claimed as new and desired to be secured by Letters Patent of the United States is:

1. A holder for a high voltage, solid state rectifier, comprising:
   first and second housing means disposed in spaced relationship for receiving the ends of a solid-state rectifier;
   door means for providing access to the interior of said housing means;
   first and second terminal means adapted to receive the ends of a solid state rectifier, at least one of said terminal means having electrical conductor means connected thereto;
   each of said housings having abutment means formed therein for slidably receiving said terminal means;
   one of said housings having an aperture formed therein for directing the electrical conductor means along a portion of the solid state rectifier; and
   means for resiliently biasing said terminal means into conducting relationship with the solid state rectifier.

2. The invention as defined in claim 1, wherein said terminal means comprise concentric cylindrical portions for receiving solid state rectifiers of different diameters.

3. The invention as defined in claim 2, wherein the edges of the terminal means are rolled.

4. A holder as defined in claim 1, wherein said first and said second housing means are formed from a continuous element.

5. A holder as defined in claim 4, wherein said door means are formed integrally with said housing means.

6. A holder as defined in claim 5, further including latching means disposed adjacent said housing means for releasably retaining said door means in a closed position.

7. A holder as defined in claim 6, wherein said electrical conductor means is directed along substantially one-third of the length of the solid state rectifier as measured from the anode end thereof.

8. A holder for an elongate high voltage solid state rectifier, comprising:
a body portion,
first and second housings associated with said body portion and disposed in spaced relation to one another, terminal means disposed within said housings for receiving the terminals of an elongate high voltage solid state rectifier,
said housings having openings for receiving the end portions of said rectifier leaving the mediate portion of said rectifier exposed for cooling,
said housings having apertures for receiving electrical conductors wherein said apertures in one of said housings are so disposed as to direct a conductor received thereby substantially parallel and in proximity to said solid state rectifier,
biasing means for urging said terminal means toward one another and against the terminals of said rectifier, and
door means for covering said openings.

9. A holder as defined in claim 8, further including strain relief means disposed adjacent one of said apertures for engaging a conductor passing therethrough.

10. A holder as defined in claim 9, wherein said door means are formed integrally with their respective housing means and said housing means are provided with projections for resiliently engaging said door means.

11. A holder as defined in claim 10, wherein at least one of said housings is provided with a plurality of apertured abutments for supporting high voltage solid state rectifiers of various lengths.

* * * * *